(No Model.)

W. S. STOCKBRIDGE.
PORTABLE FENCE.

No. 309,320. Patented Dec. 16, 1884.

Witnesses:
Wm. A. Rosenbaum
Wm. M. Stockbridge.

Inventor:
Winfield S. Stockbridge
by P. D. Stockbridge
atty

United States Patent Office.

WINFIELD S. STOCKBRIDGE, OF WASHINGTON, DISTRICT OF COLUMBIA.

PORTABLE FENCE.

SPECIFICATION forming part of Letters Patent No. 309,320, dated December 16, 1884.

Application filed September 3, 1883. (No model.)

*To all whom it may concern:*

Be it known that I, WINFIELD S. STOCKBRIDGE, a citizen of the United States, residing at Washington, in the District of Columbia, have invented certain new and useful Improvements in Portable Fences; and I do hereby declare the following to be a full, clear, and exact description of the invention, such as will enable others skilled in the art to which it appertains to make and use the same.

The object of my invention is provide an efficient portable fence at a minimum cost; and to this end it consists in the combination of a specially-constructed panel with a specially-constructed post or support, as will be hereinafter more particularly described.

I am aware that there has been proposed and patented a large variety of portable fences consisting of separately-made panels and posts or supports. The means of coupling the posts and panels, however, have proved in practice in many instances either imperfect, so that the fence as a whole is insecure, or they have been in some respects so expensive that few, if any, of these portable fences have come into use. My aim has been to produce a fence for the division of fields which will last for a considerable period at a cost which will induce its adoption and use as being more economical than fences of other kinds.

Figure 1:
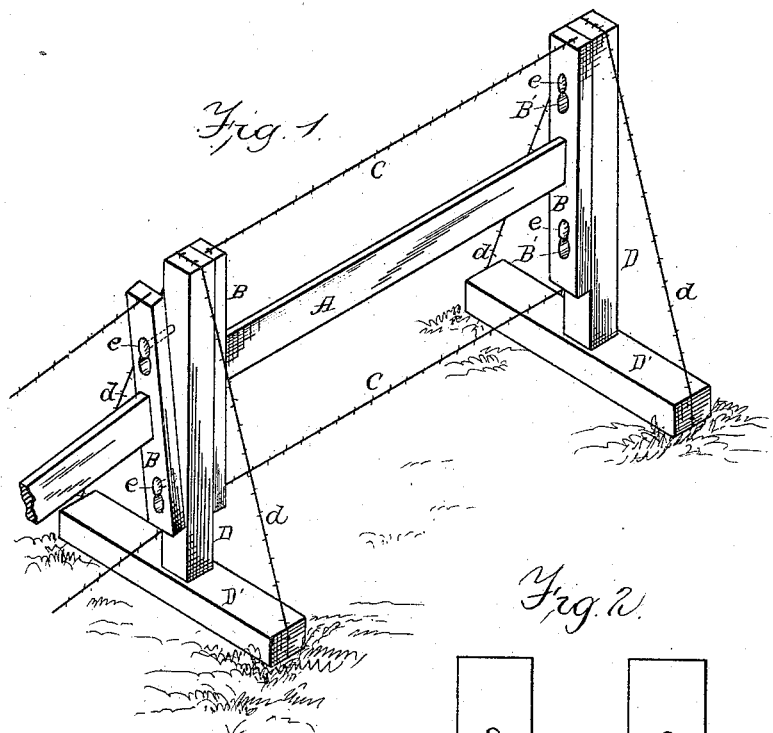
Figure 2:
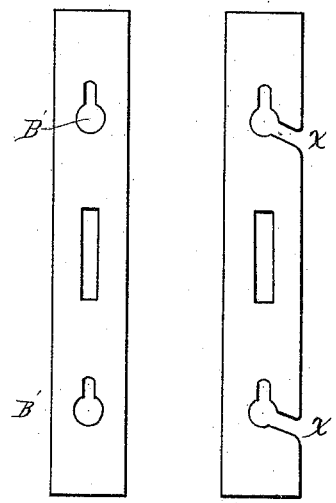

In the drawings, Figure 1 is a perspective of a section of fence made acording to my invention. Fig. 2 is a plan of one of the stiles which enter into the construction of the panel.

A is a wooden rail, which in practice is about twelve feet long and two by four inches in cross-section, having tenons made to fit in mortises in stiles B, from the extremities of which barbed wire C is stretched and secured. In this way a firm panel or length of fence is made. A greater number of lines of wire may be used where a close fence is desired. The stiles B are provided with metal button-holes or acorn-formed slots B', as shown.

D D are posts secured in cross-pieces D' D', and strengthened and protected by barbed-wire braces $d\ d$.

In making the fence the cross-pieces may be anchored by pins driven through them in a familiar way. Into the posts are driven or secured headed bolts $e\ e$, which pass through the button holes or slots B', the narrow part of which embraces the bolt behind the head, and thereby the panel and post are securely and rigidly fastened together.

In making the posts the bolts should not be driven entirely home to position, but should be left to be driven farther in as the fence is put up, so that the line may be curved or adjusted to ordinary inequalities of the ground over which the fence is made.

To provide for gates or passage-ways, there may be set up at intervals panels whose stiles are provided with open slots or notches, as shown at $x$.

A fence made according to my invention can only be taken apart without destruction by beginning at one end of the line or where passage-ways are provided. The posts are protected from strain and from the rubbing of animals by the barbed-wire braces, and the panels are similarly protected.

I am aware that a fence having slots formed in the stiles and posts parallel with the line of the fence is not new; and I am also aware that it is old to construct a fence having transverse slots and headed pins for forming the connections between the sections, and I do not claim a fence so constructed.

What I do claim, and desire to secure by Letters Patent, is—

1. In a portable fence, the combination, with the panels, the stiles of which are provided with slots or opening formed, as described, in a plane with or parallel with the line of fence, of the portable posts provided with projecting headed bolts for coupling the panel and posts, as specified.

2. A portable fence each section of which consists of a panel made with a rail, barbed wire, and stiles provided with slots formed, as described, in a plane with the fence, and portable posts or supports provided with braces and projecting headed bolts, as hereinbefore set forth.

WINFIELD S. STOCKBRIDGE.

Witnesses:
WARREN C. STONE,
V. D. STOCKBRIDGE.